United States Patent [19]

Rees et al.

[11] 4,330,257
[45] May 18, 1982

[54] TURRET-TYPE INJECTION-MOLDING MACHINE

[75] Inventors: Herbert Rees, Willowdale; Paul Brown, Orangeville; Miroslaw Grund, Brampton, all of Canada

[73] Assignee: Husky Injection Molding Systems, Inc., Bolton, Canada

[21] Appl. No.: 237,678

[22] Filed: Feb. 24, 1981

Related U.S. Application Data

[63] Continuation-in-part of Ser. No. 220,460, Dec. 29, 1980, abandoned, which is a continuation of Ser. No. 94,455, Nov. 15, 1979, Pat. No. 4,243,364.

[51] Int. Cl.³ .................... B29F 1/022; B29C 5/00; B29F 1/14
[52] U.S. Cl. .................... 425/556; 425/572; 425/574; 425/576; 425/577; 425/588; 425/589; 425/595; 425/441; 425/444
[58] Field of Search ............ 425/556, 588, 589, 595, 425/130, 134, 155, 257, 533, 537, 540, 436, 441, 443, 444, 446, 572, 574, 576, 577, 578, 153

[56] References Cited

U.S. PATENT DOCUMENTS 2,296,730 9/1942 Muller et al. ................ 425/589
3,429,007 2/1969 Aoki ........................... 425/556
3,804,576 4/1974 Hehl ........................... 425/595
3,873,257 3/1975 Vanotti ........................ 425/595
3,914,081 10/1975 Aoki ........................... 425/589
4,240,498 12/1980 Frenette ....................... 425/577
4,243,362 1/1981 Rees et al. .................... 425/556

Primary Examiner—Willard E. Hoag
Attorney, Agent, or Firm—Karl F. Ross

[57] ABSTRACT

A four-sided turret interposed between a fixed and a movable platen of an injection-molding machine, mounted on a carriage which is slidable in the direction of platen motion, is rotatable about an axis perpendicular to that direction into four operative positions spaced 90° apart. In each of these positions, in which one or more cores carried on one of its faces enter respective cavities of a confronting mold plate on the fixed platen while a corresponding core or cores on an opposite face are received in a companion plate on the movable platen, the turret is positively indexed by two aligned pins on these plates which enter respective bores in the turret upon closure of the mold; such closure, conversely, is prevented by the pins until the turret is in the proper position. The core or cores on each turret face may traverse a respective stripper plate overlying that face or may be penetrated by ejector pins carried on a relatively movable holding plate; after a workpiece molded around a core of any such face has been rotated through three turret positions, rollers linked with the associated stripper or holding plate are engaged by a pair of cam bars on the two platen-associated plates during a mold-closing stroke to dislodge the molded workpiece from its core.

7 Claims, 6 Drawing Figures

TURRET-TYPE INJECTION-MOLDING MACHINE

CROSS-REFERENCE TO RELATED APPLICATIONS

This application is a continuation-in-part of application Ser. No. 220,640 filed Dec. 29, 1980 and now abandoned, which was a continuation of our application Ser. No. 94,455 filed Nov. 15, 1979, now U.S. Pat. No. 4,243,364.

FIELD OF THE INVENTION

Our present invention relates to a injection-molding machine of the type wherein a turret with a plurality of sides is interposed between two relatively movable platens and is rotatable, about an axis transverse to the path of platen motion, into as many angularly spaced-apart operating positions as there are sides or working faces on the turret. In any operating position, one face confronts a mold plate with one or more cavities on one platen; when the turret has an even number of sides, an opposite face thereof simultaneously confronts a companion plate on the other platen. Each cavity of the mold plate is designed to coact with a projection on a confronting turret face in forming a workpiece from liquefied plastic material when the platens have been moved toward each other into a mold-closed position in which the turret is tightly clamped therebetween. The companion plate on the other platen may also have one or more cavities for the same purpose or may act merely as a second clamp jaw.

BACKGROUND OF THE INVENTION

An injection-molding machine of this type has been disclosed, for example, in U.S. Pat. No. 3,224,043 to Lameris et al. There, two cavity plates on oppositely movable platens are provided for the molding of two-color workpieces. Another use of such a turret, namely as a temporary carrier for labels to be inserted into a mold cavity, is described in U.S. Pat. No. 4,218,204 to Edwards.

Even when both platens are movable in opposite directions, the turret should also be shiftable in the direction of platen motion in order to provide extra clearance, when necessary, and to adjust itself to different mold-closing strokes when plates of different thicknesses are being used; such slidability, of course, is essential when one platen is stationary. Thus, as shown in the patent to Lameris et al, the turret may have a shaft journaled at opposite ends in two blocks that are slidable on respective pairs of tie bars serving for the guidance of the platens. The mechanism for rotating the turret will therefore not be fixedly positioned and cannot be easily coupled with the clamp drive through a positive mechanical linkage. With electrical synchronization, on the other hand, malfunctions could result in a premature closure of the mold before arrival of the turret in its next operating position; conversely, rotation of the turret could be started before the mold is fully opened, i.e. when the platens have not been sufficiently withdrawn to avoid a destruction of the freshly molded workpieces or of the mold itself by such rotation.

In our copending and prior applications identified above, we have disclosed indexing means including coacting formations on a platen and on a workpiece-extracting member for positively locking the latter in an operating position during incipient relative movement of the platens into the mold-closed position. As specifically described in these earlier applications, the member so indexable is a take-off plate inserted between two complementary mold portions on the platens.

OBJECTS OF THE INVENTION

An object of our present invention therefore, is to provide similar indexing means in a turret-type injection-molding machine.

Another object is to provide means in such a machine for facilitating the separation of freshly molded workpieces from projections or cores of a turret on which they are retained after the mold has opened.

SUMMARY OF THE INVENTION

Pursuant to one aspect of our invention, coacting formations as disclosed in our above-identified applications are provided on at least one platen and on the turret which is thereby locked against rotation as long as the platens and their plates are not substantially fully separated from the turret. By the same token, the mold cannot close unless the turret is operatively positioned. As noted in our prior applications, the initial mold-closing stroke of modern injection-molding machines is carried out under relatively low pressure and can therefore be stopped by an obstacle in the path of motion, yet a feeler could be provided to halt the pressurization of the movable platen or platens when mold closure is prevented by the indexing means.

Pursuant to another aspect of our invention, each turret face is provided with ejection means for removing one or more workpieces retained on respective cores thereof upon separation of the turret from the cavity plate in which these workpieces have been formed, the ejection means of a face not confronting either the cavity plate or its companion plate in a given operating position being engageable during a mold-closing stroke by actuating means on one or both platens for dislodging the workpiece or workpieces on that face in a direction away from the path of platen motion.

The actuating means may comprise a pair of cam bars with curved or beveled working edges designed to engage respective rollers on a stripper plate or on a frame linked with a pin-carrying holding plate constituting the ejection means, these camming edges being offset from a plane of symmetry of the platens including the turret axis.

In the machine more particularly described hereinafter, only one cavity plate is used and is secured to a stationary platen; the companion plate on the opposite platen may be utilized for a variety of purposes such as cooling or possibly trimming the workpieces previously molded in the cavity plate. With a four-sided turret the workpieces are ejected after leaving this companion plate, thus after the turret has been rotated three times through 90°. While the platens in that embodiment rise from a horizontal bed and the turret has a vertical axis, the features described hereinafter are also applicable to upright molding machines with vertically moving platens and horizontal turret axes.

BRIEF DESCRIPTION OF THE DRAWING

The above and other features of our invention will now be described in detail with reference to the accompanying drawing in which.

SPECIFIC DESCRIPTION

Figure 1:
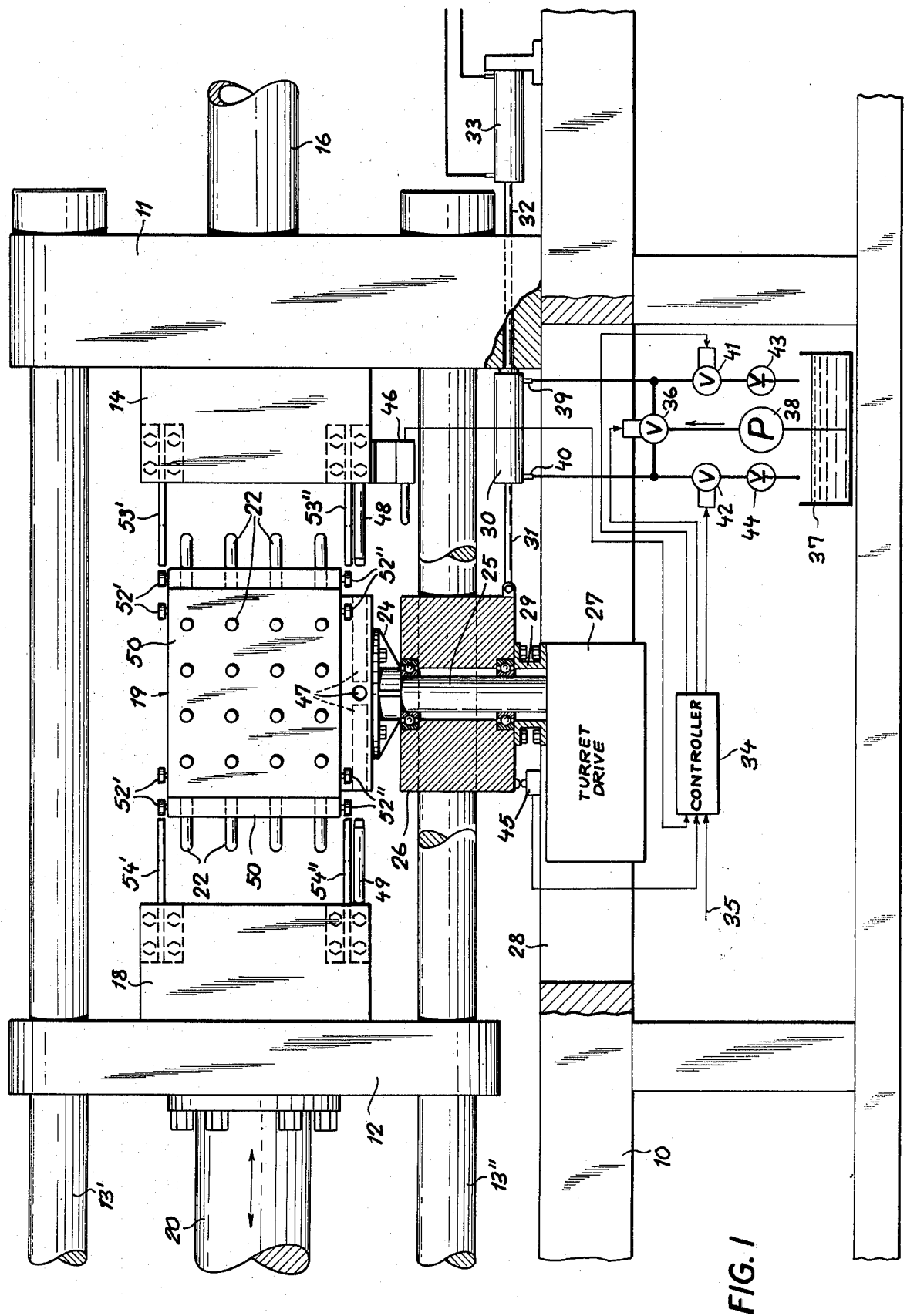
FIG. 1 is a side-elevational view, partly in section, of a significant portion of an injection-molding machine embodying the present improvement, shown in a mold-open position.
Figure 2:
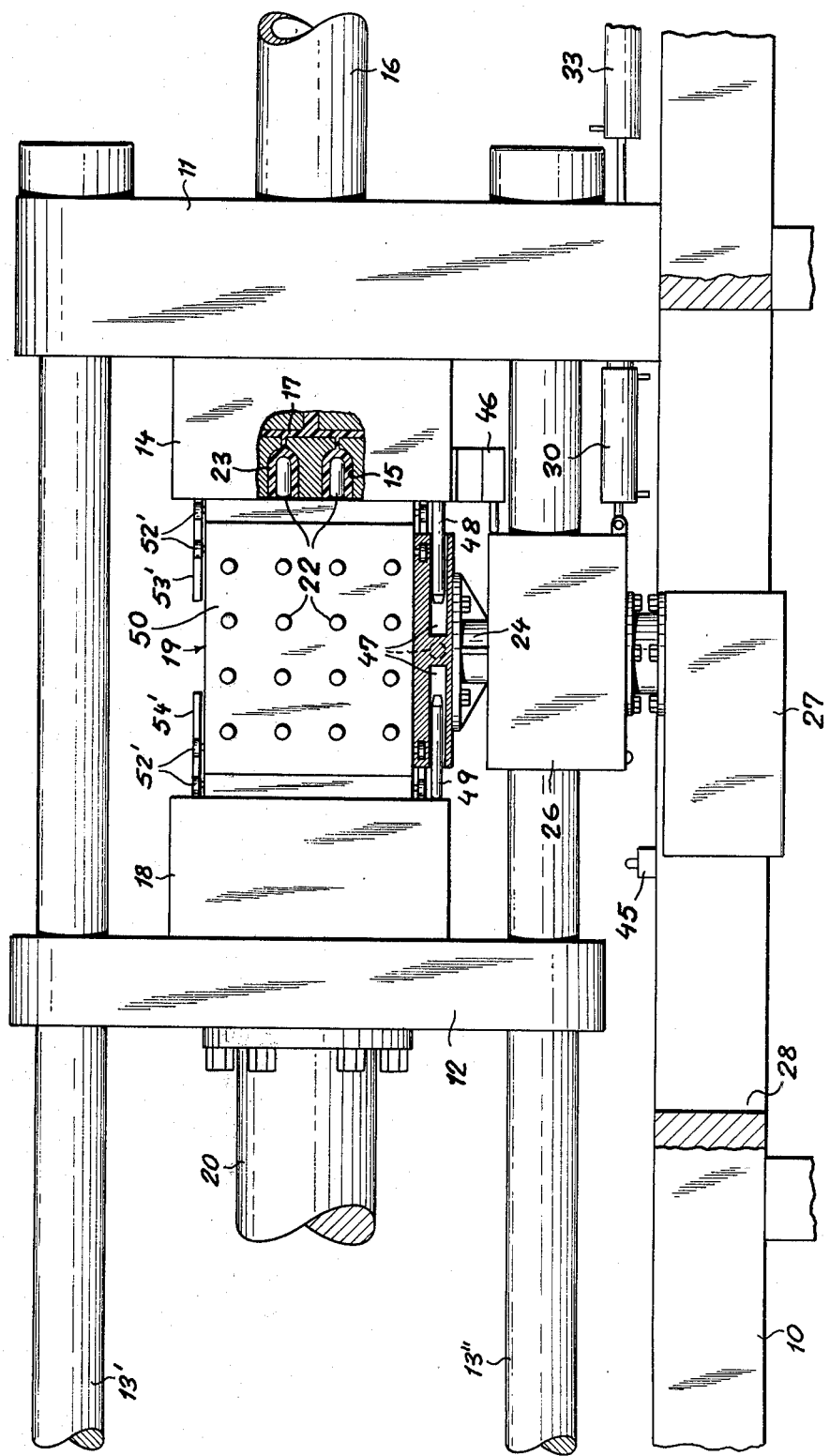
FIG. 2 is a view similar to FIG. 1, showing a molding-closed position.
Figure 3:
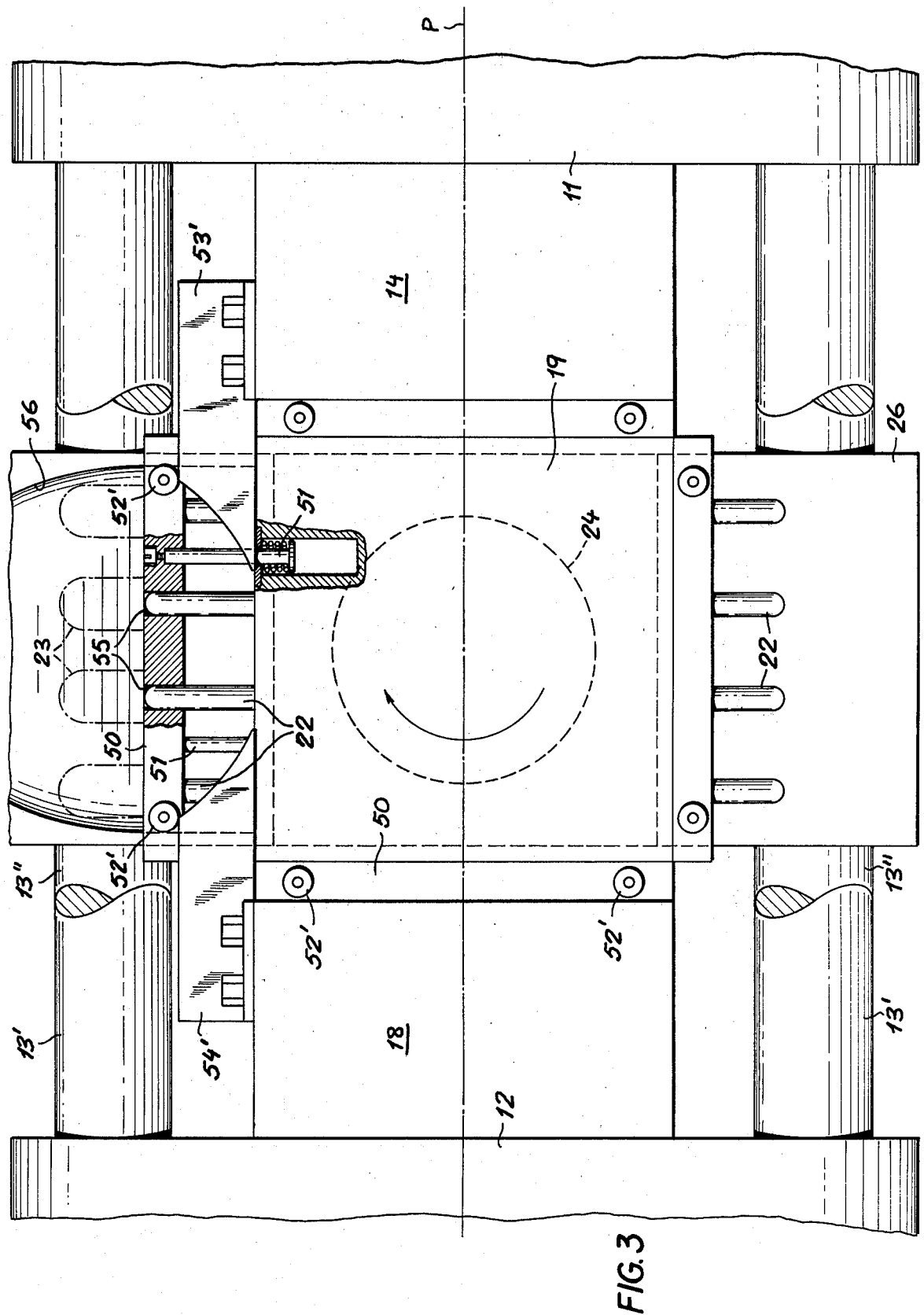
FIG. 3 is a top view of the assembly illustrated in FIGS. 1 and 2, drawn to a larger scale.

The injection-molding machine shown in FIGS. 1–3 comprises a horizontal bed 10 with a stationary platen 11 fixedly mounted thereon; a movable platen 12 is shiftable on an upper and a lower pair of tie bars 13', 13" extending from platen 11 to a nonillustrated mounting rigid with bed 10. Platen 11 carries a mold plate 14 with a multiplicity of cavities 15 to which plastic material is admitted in the position of FIG. 2 by way of an injection cylinder 16 and sprue channels 17. A companion plate 18 on platen 12 serves as a pressure member for clamping a four-sided turret 19 between itself and mold plate 14 when platen 12 is driven by a reciprocating ram 20 into its position of closest approach of platen 11. Each face of turret 19 carries a set of projecting cores 22 which, in a position confronting plate 14, enter respective cavities 15 thereof to form workpieces 23, e.g. parisons for blow-molding purposes.

Turret 19, whose horizontal outline is square, is carried on a platform 24 with a shaft 25 journaled in a carriage 26 that is shiftable on the lower tie bars 13". An electromechanical driving unit 27, received in a cutout 28 of bed 10, is linked through a sleeve 29 with carriage 26 for joint displacement by a hydraulic jack 30 having a piston rod 31 connected with that carriage. The cylinder of jack 30 is rigid with a piston rod 32 of another hydraulic jack 33 fixed to bed 10; piston rod 32 is guided in a bore of platen 11. The two cascaded jacks 30 and 33 lie in a longitudinal plane of symmetry, indicated at P in FIG. 3, which includes the axis of turret 19 and bisects the platens 11 and 12.

Jack 30 is electrically synchronized with the clamp drive reciprocating the ram 20 to position the turret 19 midway between plates 14 and 18 when the mold is open, as shown in FIG. 1. For this purpose, a controller 34 receives signals from the clamp drive via a lead 35 to operate a three-way valve 36 through which oil from a sump 37 can be delivered by a pump 38 to one of two ports 39, 40 of the jack; the port not connected to the sump 38 is drained to the assembly through a respective valve 41, 42 in series with a throttle 43, 44. Controller 34 also responds to signals from two limit switches 45 and 46 which are respectively tripped when the carriage reaches its midposition between the separated clamping plate 14, 18 (FIG. 1) and when it is withdrawn into close proximity with plate 14 in the mold-closed position (FIG. 2). In the latter position, the cylinder of jack 30 is drained at both ends so that turret 19 can yield to the exerted clampng pressure. Limit switch 45, laterally offset from cutout 28, can be adjustably mounted on bed 10 to allow for plates of different thicknesses.

Jack 33, whose hydraulic control system has not been represented, is normally maintained in the illustrated position in which its piston rod 32 holds the cylinder of jack 30 close to platen 11. It is used only during servicing in order to enlarge the space between plate 14 and turret 19 for more convenient access thereto.

In accordance with an important feature of our invention, the base of turret 19 is provided on each side with a bore 47 alignable with one of two pins 48, 49 which project midway from plates 14 and 18, respectively, to serve as indexing means for positively holding the turret in an operating position in which two of its faces are exactly parallel to these plates. Thus, the pins enter the aligned bores in an initial phase of a mold-closing stroke and thereupon prevent any further rotation of turret 19 by its drive motor in unit 27. Conversely, the mold-closing stroke will be arrested by the pins 48 and 49 if the bores are not in line therewith.

As best seen in FIG. 3, each free of turret 19 is provided with a stripper plate 50 normally held in contact therewith by spring-loaded rods 51. Each stripper plate 50 carries a pair of rollers 52' on its upper edge and a similar pair 52" on its lower edge, these rollers being engageable during a mold-closing stroke by curvilinear edges of respective cam bars 53', 53" on plate 14 and 54', 54" on plate 18. Each stripper plate has perforations 55 penetrated by respective cores 22 which normally project beyond that plate from the corresponding turret face. When the mold is closed, as shown in FIGS. 2 and 3, the stripper plate 50 then located on one side of midplane P is moved outward to dislodge the workpieces 23 still held on the associated cores 22. A part of carriage 26 underlying the last-mentioned stripper plate forms a sloping channel 56 on which the ejected workpieces can roll onto a nonillustrated conveyor for removal to a further destination, e.g. to a blow-molding stage. With turret 19 assumed to undergo intermittent clockwise rotation as viewed in FIG. 3, workpieces molded in one cycle will arrive in the next cycle at a location opposite the ejection station in which they will cool in ambient air while a new set of workpieces are molded. In a third cycle, the workpieces enter the hollow plate 18 for further cooling and/or trimming; they could also be subjected in respective cavities of the latter plate to a second molding step with different material, e.g. as known from the patent to Lameris et al referred to above. In the fourth cycle the workpieces are ejected as described above.

Figure 4:
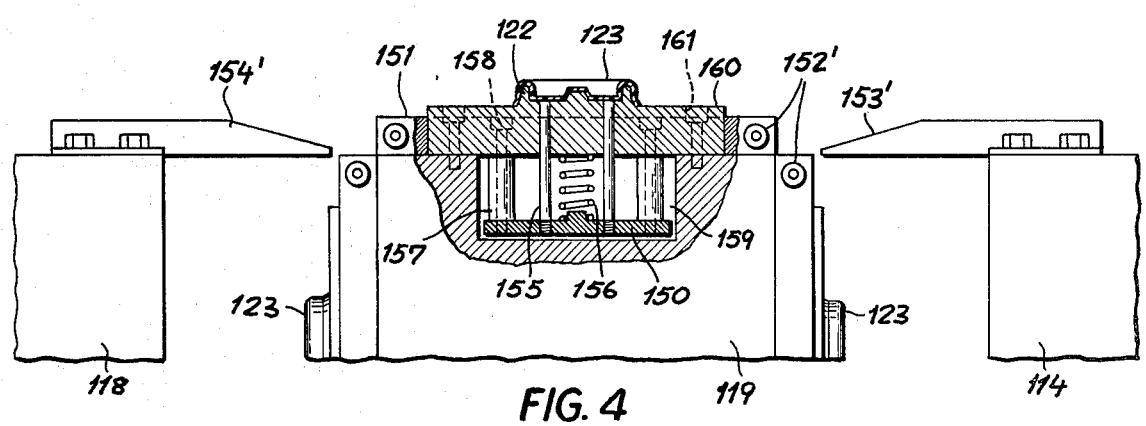
FIGS. 4 and 5 are fragmentary top views (parts broken away) of another embodiment with a modified ejection mechanism, respectively shown in a mold-open and a mold-closed position.
Figure 5:
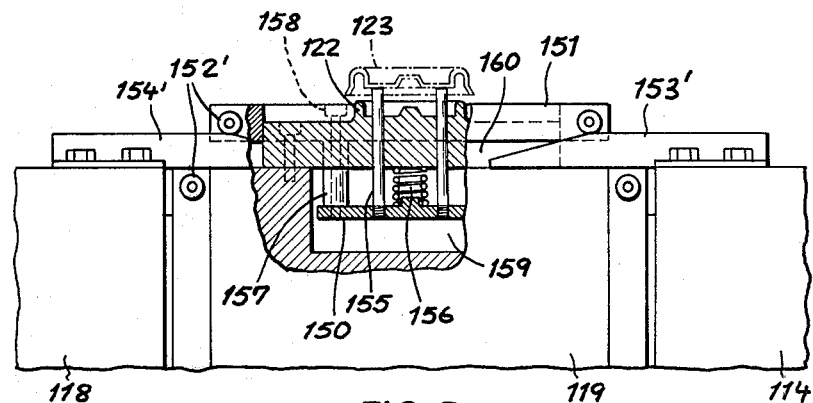
Figure 6:
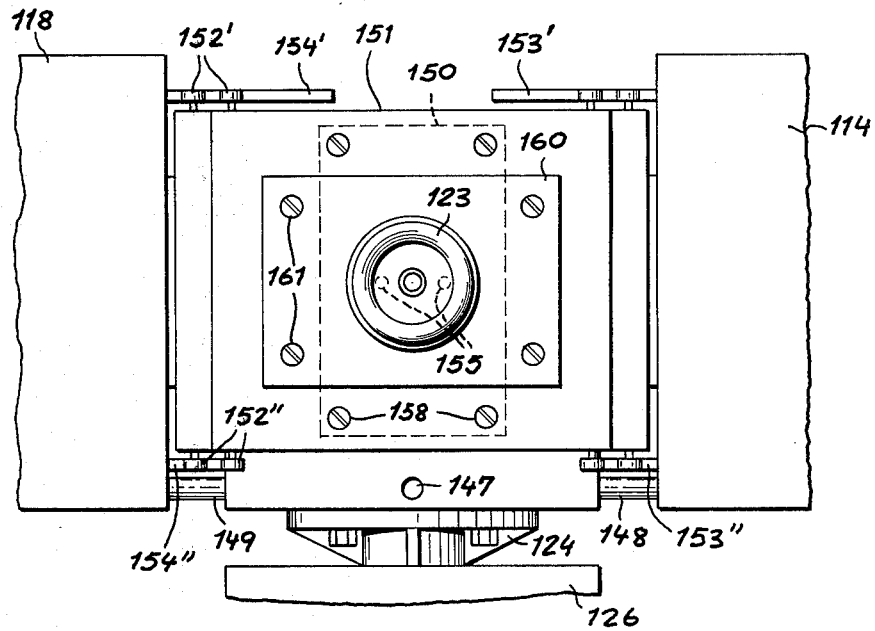
FIG. 6 is a side-elevational view of part of the machine of FIGS. 4 and 5 in the mold-closed position.

In FIGS. 4, 5 and 6 we have shown part of a machine generally similar to that of FIGS. 1–3, with a stationary mold plate 114, a movable companion plate 118 and a turret 119 mounted via a platform 124 on a slidable carriage 126. As before, the base of the turret is provided on each of its four sides with a bore 147 in which locking pins 148, 149 on plates 114 and 118 may engage when the mold closes.

Each lateral face of turret 119 has a mounting plate 160 fixedly secured thereto by screws 161, that plate carrying a core 122; obviously, though, more than one core may be formed on any such plate. A rectangular recess 159 in each turret face accommodates a holding plate 150 carrying ejector pins 155 which traverse the respective mounting plate 160 and penetrate its core 122. A rectangular frame 151 closely surrounds the mounting plate 160 and is linked via spacing sleeves 157 and bolts 158 with holding plate 150; a compression spring 156 inserted between plates 150 and 160 normally holds the ejection unit 150, 151 in a retracted position (FIG. 4) in which the tips of pins 155 are flush with the bottom of core 122.

After a workpiece 123 has been molded on core 122 in a corresponding cavity of plate 114, and after the turret 119 has been stepped three times through 90° as described above, the next mold-closing stroke brings beveled working edges of upper and lower cam bars 153′, 153″ and 154′, 154″ on plates 114 and 118 into engagement with peripherally aligned rollers 152′, 152″ of the associated frame 151 whereby the latter is moved outward relatively to plate 160. Pins 155, entrained by frame 151 through holding plate 150, then dislodge the cooled workpiece 123 from its core 122 as shown in FIG. 5.

Turret 19 or 119 can be provided with internal channels for the circulation of a cooling fluid to expedite the hardening of the molded workpiece.

The movement of carriage 26 could also be correlated with that of platen 12 by an articulated linkage as shown, for example, in U.S. application Ser. No. 45,540 in the names of Herbert Rees and Jim Nevrela, now U.S. Pat. No. 4,243,362. The disclosed control by cascaded hydraulic jacks, however, offers greater flexibility and more convenient access for servicing.

We claim:

1. An injection-molding machine comprising:
   a pair of relatively movable platens;
   a mold plate with at least one cavity on one of said platens communicating with a source of plastic material for forming a workpiece in said cavity upon relative movement of said platens toward each other into a mold-closed position;
   a turret with at least four faces rotatable into as many operating positions about an axis transverse to the path of platen motion, said turret being shiftable along said path between said platens upon relative movement of said platens away from each other into a mold-open position and being provided with a core on each of said faces receivable in said cavity in a respective operating position for extracting a freshly molded workpiece from said path of platen motion;
   indexing means including coacting formations on at least one of said platens and on said turret for positively locking said turret in any operating position during incipient relative movement of said platens into said mold-closed position;
   a companion plate on the other of said platens confronted by one of said faces in any operating position of said turret and adapted to receive the core of the confronting face during mold closure; and
   ejection means on each of said faces for removing a workpiece from a respective core, at least one of said platens being provided with actuating means effective during a mold-closing stroke to engage the ejection means on a face of said turret not confronting either of said mold and companion plates for dislodging a workpiece in a direction away from said path.

2. A machine as defined in claim 1 wherein said coacting formations are pins on said mold and companion plates and bores in said turret aligned with said pins in any rotary operating position.

3. A machine as defined in claim 1 or 2 wherein said ejection means comprises a movable member disposed adjacent the respective face of said turret, said actuating means comprising a pair of cams on said mold and companion plates engageable with cam followers on said member for displacing same relatively to the adjacent face against a countervailing biasing force.

4. A machine as defined in claim 1 or 2 wherein said cams are bars with working edges offset from a plane of symmetry of said platens including the axis of said turret, said cam followers being rollers peripherally aligned with said working edges.

5. A machine as defined in claim 1 or 2 wherein said mold plate has a multiplicity of mold cavities and each of said faces carries a like multiplicity of cores, said ejection means comprising a stripper plate with a like multiplicity of perforations penetrated by respective cores, said actuating means comprising a pair of cam bars on said mold and companion plates engageable with rollers on said stripper plate for separating same from the adjacent face against a countervailing biasing force.

6. A machine as defined in claim 1 or 2 wherein each of said faces is provided with a core-carrying mounting plate overlying a recess in said turret, said ejection means comprising a holding member in said recess carrying at least one projection penetrating said mounting plate and further comprising a frame surrounding said mounting plate, said frame being linked with said holding member, said actuating means comprising a pair of cam bars on said mold and companion plates engageable with rollers on said frame for displacing the latter together with said holding member relatively to said mounting plate against a countervailing biasing force whereby said projection dislodges a freshly molded workpiece from a core on said mounting plate.

7. In an injection-molding machine provided with a pair of relatively movable platens, a mold plate with at least one cavity on one of said platens, and a turret shiftable along the path of platen motion between said platens, said turret having a plurality of faces and being rotatable about an axis transverse to said path into a number of operating positions equal to the number of said faces, said mold plate being confronted in each of said operating positions by one of said faces while at least one other of said faces lies in a plane offset from the center of said path, said faces being provided with cores entering said cavity in a mold-closed position of said platens to enable the molding of workpieces therearound,
   the combination therewith of ejection means on each of said faces for removing a workpiece retained on a respective core upon separation of said turret from said mold plate during a mold-opening stroke, at least one of said platens being provided with actuating means effective during a mold-closing stroke to engage the ejection means on a face of said turret not confronting said mold plate for dislodging a workpiece in a direction away from said path.

* * * * *